Figure 1:
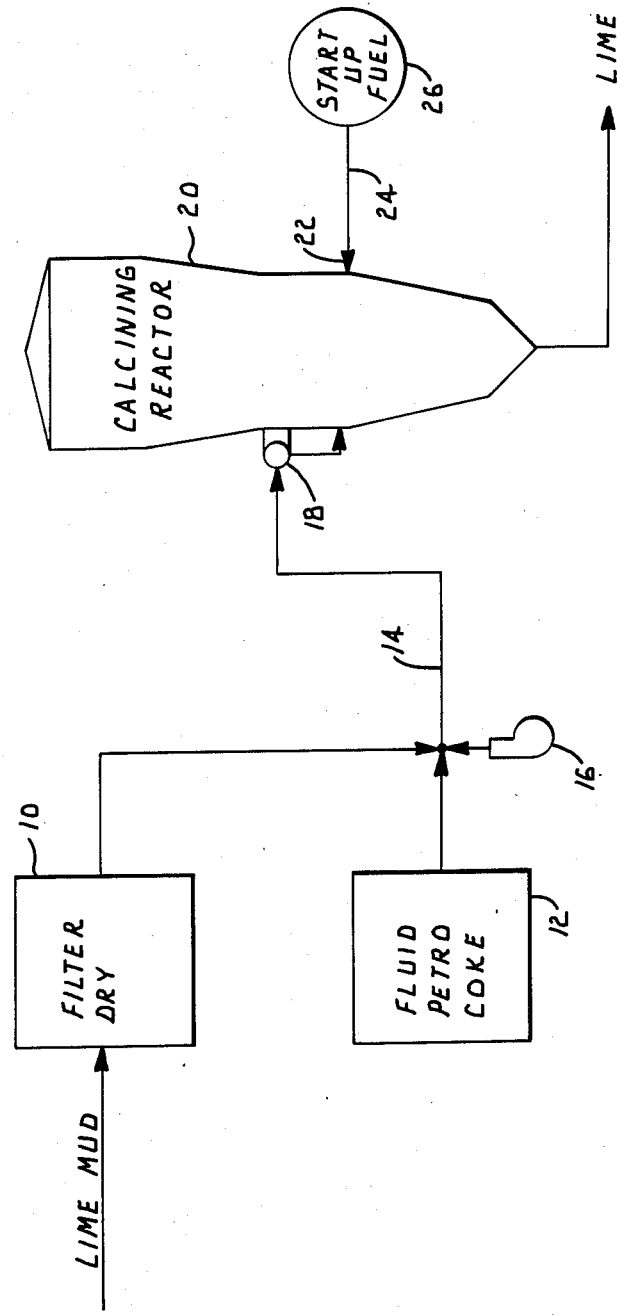

United States Patent [19]

Casper et al.

[11] Patent Number: 4,631,025
[45] Date of Patent: Dec. 23, 1986

[54] CALCINING PROCESS USING FLUID COKE FUEL

[75] Inventors: Robert K. Casper; James F. Runner, both of Wichita, Kans.

[73] Assignee: Koch Carbon Inc., Wichita, Kans.

[21] Appl. No.: 767,614

[22] Filed: Aug. 20, 1985

[51] Int. Cl.$^4$ ............................................. F27B 15/00
[52] U.S. Cl. ...................................... 432/15; 423/638
[58] Field of Search ............................ 432/14, 58, 15; 423/638, 175

[56] References Cited

U.S. PATENT DOCUMENTS 3,707,462  12/1972  Moss ............................... 423/638 X
4,216,197  8/1980   Moss .................................... 423/638

Primary Examiner—Edward G. Favors
Attorney, Agent, or Firm—Kokjer, Kircher, Bradley, Wharton, Bowman & Johnson

[57] ABSTRACT

A method of calcining in a fluidized reactor wherein fluid petroleum coke is utilized as the reactor fuel. The method of the present invention utilizes fluid coke as the fuel for a calcining reactor. The fluid coke is introduced into the pneumatic stream with the lime feed material, ahead of the reactor feed header, to achieve an intimate mixing of the fuel and the feed material. This facilitates calcination of the calcium carbonate and results in more efficient utilization of fuel than in methods of the prior art. Advantages of using fluid coke as the fuel include that it is of a size fine enough to provide efficient utilization as a fuel but not so large that inefficient utilization, unstable temperatures, and carry-over into the final product result. Another advantage is that the fluid coke typically contains 5-7% by weight sulphur, a necessary ingredient in proper calcination of calcium carbonate in a fluidized reactor and one that has been required to be added in methods of the prior art.

10 Claims, 1 Drawing Figure

CALCINING PROCESS USING FLUID COKE FUEL

This invention relates generally to calcining processes and, more particularly, to a method of calcining in a fluidized reactor wherein fluid petroleum coke is utilized as the reactor fuel.

It is known to utilize vertical fluid bed calciners for calcining lime mud and other products. A typical process involves drying the mud followed by calcination of it in the fluid bed reactor. The dry mud contains calcium carbonate which is fed into the fluidized reactor by a pneumatic stream. The reactor has been preheated and is fed by a fuel so as to maintain the reactor at a temperature of 1500°–2000° F. so as to support the calcination process. Manifestly, there are substantial fuel requirements for the large reactors needed to carry out the process at such a high temperature. Both gas and fuel oil have been utilized to fire the reactor although virtually all such reactors today rely on fuel oil. Unsuccessful attempts have also been made to utilize wood waste as an alternative fuel. Powdered coal is undesirable because of its relatively high ash content. There have also been attempts to utilize delayed coke in powdered form as the fuel for a fluid calcining reactor. This material must be ground or otherwise comminuted to reduce its particle size before it can be used as a fuel. It has been found that delayed coke that has been comminuted or ground will generally be either too fine resulting in inefficient calcination, high temperature loads in the free board section of the vessel and carbon carry-over, or too large, resulting in inability to maintain operation temperatures and presenting a risk of carry-over into the final product. This product is also not uniform in particle size and configuration. It is, however, generally recognized that delayed coke is easier to burn that fluid coke.

It is therefore a primary object of the present invention to provide a calcining process utilizing a novel fuel, namely fluid coke, which overcomes the disadvantages of solid fuels which have been used in the past.

Another object of the invention is to provide an alternative fuel for a calcining reactor which is more economical than fuel oil or gas.

It is also one of the aims of our invention to provide a calcining process utilizing a novel fuel, namely fluid coke, which inherently includes sufficient sulfur so as to eliminate the need to add additional sulfur as has been the case with fuels of the prior art.

Another one of the aims of this invention is to provide a fuel for a calcining process wherein the fuel contains sulfur thus resulting in a more intimate mixture of sulfur and calcined material than can be accomplished when sulfur is added to the reactor independently.

Still another object of the invention is to provide a process for calcining materials wherein a novel solid fuel, fluid coke, is provided which is of a particle size that matches the particle size of the material being calcined resulting in more efficient use of fuel and superior calcining.

Other objects of the invention will be made clear or become apparent from the following description and claims when read in light of the accompanying drawing wherein the single FIGURE is a schematic illustration of the process of calcining according to the teachings of the present invention.

A conventional lime processing plant utilizes a source of lime mud which is washed, dried and fed into a reactor where a fuel is utilized to heat the material to a high temperature, typically 1500°–2000° F. where the calcium carbonate is converted to calcium oxide, commonly referred to as lime. A particularly useful reactor is one which is sold under the trademark FLUOSOLIDS reactor by Dorr-Oliver Incorporated of Stanford, Conn. This reactor is a two-compartment vessel with the top compartment housing a fluid bed where calcining occurs along with pelletizing of the resultant calcium oxide. The bottom portion of the bed cools the calcined material to approximately 400°–600° F. and the dried and cooled material is then fed to a storage area. Reactors of the general type shown in U.S. Pat. Nos. 4,152,110 and 4,343,246, both of which are incorporated by reference into the present specification, may also be utilized.

Referring to the drawing, the processing steps of filtering and drying of the lime mud are indicated schematically at 10 and the storage bin for fluid petroleum coke is indicated at 12. The prepared lime mud and fluid coke are both delivered to a line 14 which is kept under a pressure of approximately 8 p.s.i.g. by a positive displacement blower 16. Line 14 delivers the mixture of processed feed lime material and petroleum coke to a feed header 18 of calcining reactor 20. Reactor 20 is also provided with a fuel header 22 which circumscribes the center portion of the reactor. Startup fuel such as fuel oil is delivered to this fuel header 22 via a line 24 from a storage area 26.

It is to be understood that, in normal operation of reactor 20, the start up fuel will be introduced only for sufficient time to heat the calcining bed to a calcination temperature of between 1500°–2000° F. and stabilize the temperature at that range before fluid petroleum coke is slowly introduced through feed header 18 while reducing the quantity of fuel oil correspondingly. While a small quantity of startup fuel may continue to be used during the calcination process, it is preferable to terminate the startup fuel once the temperature is stabilized by a full load of fluid coke and feed lime material.

The fluid coke utilized in the process of the present invention is generally of a particle size of between 150–850 microns with a size of 300–850 microns being preferred. A typical size distribution for fluid coke as used in the present invention is indicated in Table 1. Table 2 indicates optimum size distribution for the material.

TABLE 1

| % Retained | Mesh # | Microns |
|---|---|---|
| 10 | 20 | 850 |
| 3 | 30 | 600 |
| 20 | 40 | 425 |
| 34 | 50 | 300 |
| 9 | 60 | 250 |
| 8 | 80 | 180 |
| 5 | 100 | 150 |
| 11 | −100 | |

TABLE 2

| % Retained | 20 × 50 Mesh Mesh # | Microns |
|---|---|---|
| 15 | 20 | 850 |
| 5 | 30 | 600 |
| 30 | 40 | 425 |
| 40 | 50 | 300 |

TABLE 2-continued

| % Retained | 20 × 50 Mesh Mesh # | Microns |
| --- | --- | --- |
| 10 | −50 | |

Note: Screen Size for both tables are ASTM Standard E-11-81.

By introducing the fluid coke into a pneumatic stream with the lime feed mud, ahead of the reactor feed header, an intimate mixing of the fluid coke and the feed product is obtained. This facilitates calcination of the calcium carbonate to present calcium oxide and results in a much more efficient utilization of fuel than is the case with fuels which are introduced directly into the reactor at a location separate from the feed stock.

It is also an advantage of the fuel of the present invention that fluid coke typically contains 5–7% by weight of sulphur. Sulphur is a necessary ingredient in proper calcination of calcium carbonate in reactor 20 in order to keep the particles fluid in the fluidized bed section of the reactor. With other fuels such as oil, elemental sulphur or some other source of sulphur must be added to the reactor to achieve the desired results.

Fluid coke has been found to be of a desirable particle size for utilization in a calcining reactor in that the particles are fine enough so as to provide efficient utilization as a fuel without being too fine which will result in inefficient calcination and possible carbon carryover. The produce is also not too large which can result in inefficient utilization and unstable temperatures as well as present a further problem of carryover into the final product. One of the advantages of fluid coke as a fuel is believed to be the particle size which is closer to that of the calcined end product than other known fuels. This further enhances the results which are obtained utilizing fluid coke as a fuel.

We claim:

1. In a calcining process wherein a material is placed in a reactor with a combustible fuel for calcination, the improvement comprising:
   introducing into said reactor a quantity of fluid petroleum coke.

2. In a process as set forth in claim 1, wherein said reactor comprises a fluidized bed and said introducing step comprises pneumatically directing said coke into said reactor.

3. In a process as set forth in claim 2, wherein said fluid coke is largely characterized by a particle size fine enough to pass a 20 mesh screen and coarse enough to not pass a 100 mesh screen.

4. In a process as set forth in claim 2, wherein said introducing step comprises introducing a sufficient quantity of said fluid coke to maintain a desired calcination temperature.

5. In a process as set forth in claim 2, wherein said introducing step comprises introducing said fluid coke into a feed stream for said material ahead of said reactor.

6. In a process as set forth in claim 5, wherein said introducing step comprises pneumatically conveying said material and said fluid coke into said reactor simultaneously.

7. In a lime calcining process wherein a calcium containing material is introduced into a fluidized bed reactor together with a combustible fuel, the improvement comprising:
   introducing into said reactor a quantity of fluid petroleum coke largely characterized by a particle size small enough to pass a 20 mesh screen and large enough not to pass a 100 mesh screen.

8. In a process as set forth in claim 7, wherein said introducing step comprises directing said coke into a pneumatic feed stream of the calcium containing material before the latter enters the reactor.

9. In a process as set forth in claim 7, wherein said calcium containing material comprises calcium carbonate and said introducing step comprises introducing a sufficient quantity of said coke into said reactor to maintain calcination temperature without auxiliary fuel.

10. In a process as set forth in claim 7, wherein said calcium containing material comprises calcium carbonate and said introducing step comprises introducing fluid petroleum coke having a sufficiently high sulfur content to maintain particles of said material fluid without the need to add additional sulfur.

* * * * *